May 22, 1951 G. K. GRAHAM 2,554,458

VOLUME CONTROL FOR PROGRAM CIRCUITS

Filed May 15, 1947

INVENTOR.
GEORGE K. GRAHAM
BY H. G. Grover
ATTORNEY

Patented May 22, 1951

2,554,458

UNITED STATES PATENT OFFICE 2,554,458

VOLUME CONTROL FOR PROGRAM CIRCUITS

George K. Graham, Oceanside, N. Y., assignor to Radio Corporation of America, a corporation of Delaware Application May 15, 1947, Serial No. 748,289

6 Claims. (Cl. 179—171)

This invention relates to volume control circuits and more particularly to a device of this class which will avoid overloading of the circuits or undesirable noise amplification.

It is customary, in the methods of transmitting now in use, to control the amplifier circuits so as to reduce the rate of amplification, for the louder portions of the program being transmitted and to increase the rate of amplification for weak signals so that they will be greater than noise which may be introduced in the circuits.

Particularly in the communication field, where program material may have a relatively large dynamic range and such program material is transmitted over wire lines or radio transmitting facilities, due to limitations in handling capacity and in signal to noise ratio, it has been the practice to restrict the transmitting dynamic range by means of volume level controls with or without electronic compression equipment.

The problem resolves itself into two major requirements. The first, to raise the transmitted level on low level program material to overcome noise originating at the program source and contributed by the transmitting facilities. The second, to restrict high level passages to a value which can be safely handled by the transmitting facilities.

It is an object of this invention to provide an electrical circuit which will automatically meet the afore-mentioned requirements.

It is a further object of this invention to provide an electrical circuit of this type which will be simpler in operation and will give a wider range of control than former circuits designed for this purpose.

Briefly, in accordance with the invention, an electron discharge tube having a variable amplification factor is controlled through its grid bias. The "high levels" are reduced by providing a series of push-pull rectifiers shunting a portion of the grid bias resistor. The rectifier tubes are brought into operation at successively increasing power output levels. The "low levels" are cared for in a somewhat similar arrangement in which a rectifier controls the current drawn by a triode shunted across a portion of the grid bias resistor.

The above and other objects and advantages of this invention will become apparent upon a consideration of the following detailed description taken in conjunction with the accompanying drawings, in which.

Figure 1:
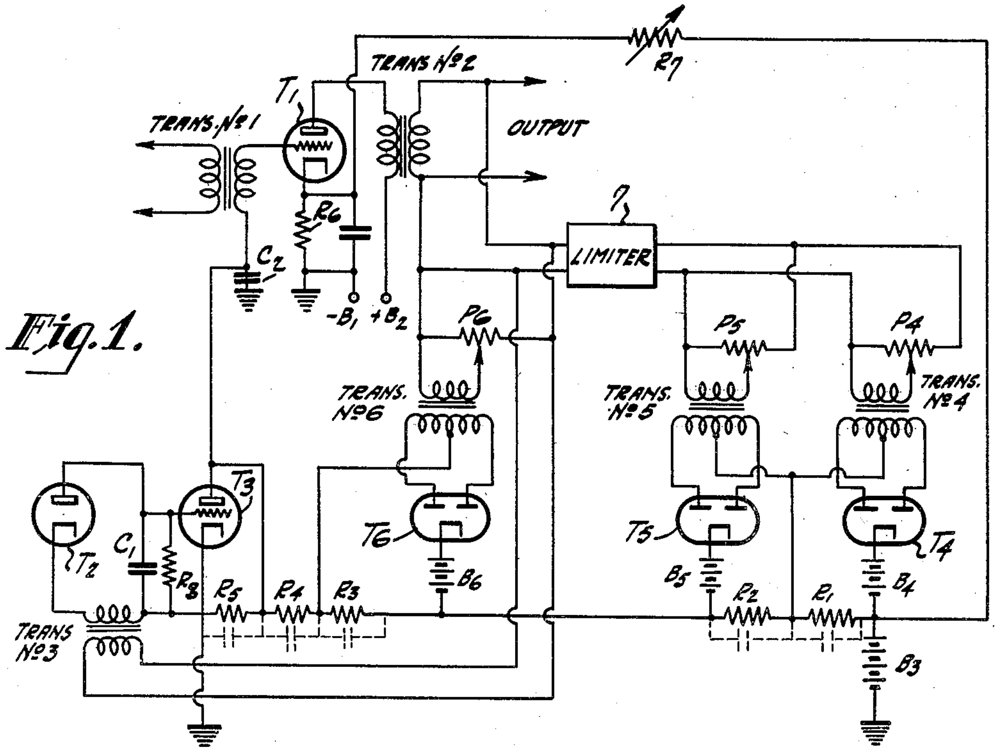
Fig. 1 is a schematic diagram of a preferred embodiment of the invention.

Referring to Fig. 1, the signal is supplied to a conventional variable-$\mu$ type of amplifying tube T1 through input transformer 1. The grid of tube T1 is connected to the secondary of transformer 1, the other end of which is grounded through condensor C2. The cathode of tube T1 is connected to ground through resistor R6. The plate of tube T1 is connected to the primary of output transformer 2, the other end of which is connected to a source of positive potential B2. A biasing source of potential shown as the battery B3 has its negative terminal grounded. Its positive terminal is connected through resistor R7 to the cathode of tube T1. Resistors R6 and R7 provide an adjustable value of positive potential applied between the cathode of tube T1 and the negative power supply lead B1 for the tube. This provides a fixed negative bias which establishes the amplification of this stage.

Tapped across the output of transformer 2, there is placed a transformer 3, the secondary of which is connected between the cathodes of a rectifier tube T2 and an amplifying tube T3. The anode of tube T2 is connected to the grid of tube T3. A bias resistor R8 and condensor C1 are connected in parallel between the grid of tube T3 and its cathode. The plate of tube T3 receives plus voltage from battery B3 through resistors R1, R2, R3 and R4. The plate of this tube is also connected to the grid of tube T1 through the secondary of input transformer 1. Resistor R5 connects the plate of tube T3 to the negative power supply return lead.

Also shunted across the output of transformer 2 are transformers 4, 5 and 6 through potentiometers P4, P5, and P6, respectively. The secondaries of transformers T4, T5, and T6 are center tapped and have their end terminals connected to the plates of twin diode rectifiers T4, T5, and T6, respectively. The center taps of transformers T4 and T5 are connected together and to the junction of resistors R1 and R2. The center tap of transformer T6 is connected to the junction of resistors R3 and R4. The cathode of rectifier T4 has a positive potential applied to it by means of battery B4. Similarly the cathodes of resistors T5 and T6 have positive potentials supplied to them by means of batteries B5 and B6, respectively. As will appear, batteries B4, B5 and B6 supply an increasing potential to their respective tubes.

In series with the leads to transformers 4 and 5, there is shown block 7 representing any desired type of limiting amplifier. Such amplifiers are well known in the art and function normally in this invention.

The circuits and devices associated with tubes T2 and T3 are provided in order to effectuate an increase of amplification during low level passages and at the same time provide that in the absence of a signal the amplification of tube T1 is reduced.

Any signal voltage appearing at the output leads of transformer 2 will be applied through transformer 3, between the cathode and plate of diode T2. Such a signal will cause a voltage drop across resistor R8 which will apply a negative potential to the grid of tube T3 with respect to its cathode. This negative potential will decrease the plate current of tube T3 and, if made sufficiently high, will cause the plate current to approach zero. When the plate current of tube T3 approaches zero, the voltage drop through resistors R1, R2, R3 and R4 will be of a low value. This will mean that the potential of plate T3 with respect to the negative power supply return lead will be relatively high, resulting in the application of a positive voltage to the grid of tube T1. This positive voltage will counteract in part the positive potential applied to the cathode of tube T1, effectively reducing the negative grid bias of tube T1 and consequently increasing its amplification. In the absence of a signal voltage applied to transformer T3, or signal voltages of small magnitude, tube T3 will draw relatively large values of plate current. Under these conditions the positive potential of tube T3 with respect to negative power supply return lead will be small in value and the negative bias applied to the grid of tube T1 will be relatively high and the amplification of the stage consequently reduced.

The above functioning will thus provide a means for reducing the amplification during no signal or low level signals and increasing the amplification during program material above an established minimum. Suitable time constants will, of course, be used to provide a time delay in association with this function. Condenser C1 is illustrative of such time delay means.

For program materials above the prescribed minimum level the gain control functions are performed by diode tubes T4, T5 and T6.

For the purpose of analysis, let it be assumed that the program material being supplied to tube T1 is of a level sufficiently high to have caused tube T3 to approach plate current cut-off which will provide a value of negative bias to tube T1 which will provide a high value of amplification. Diode tube T4 has interposed between its cathode and the center tap of transformer 4 a biasing voltage which applies a positive potential to the cathode of T4 with respect to its plates. Under these conditions no plate current will flow until the voltage applied to the plates of T4 reaches a value in excess of this biasing potential.

Figure 2:
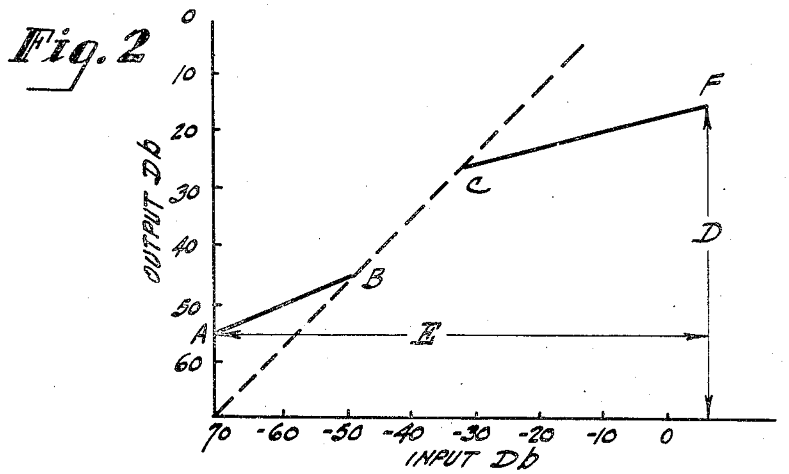
Fig. 2 represents a curve illustrative of the power output produced by such a system.

When the applied voltage to diode tube T4 is in excess of this biasing voltage the plate current flow through diode T4 causes a voltage drop across R1 in such a direction as to increase the negative bias applied to amplifying tube T1. This causes a reduction in the amplification of tube T1 and a reduction in volume level of the signal. The action of diode T4 is illustrated in Fig. 2 where point A would serve to indicate the point at which conductivity of diode T4 is established. Increasing input signal levels will cause further reductions in the amplification of T1.

Diode tube T5 has in its cathode a similar biasing means to that used in diode tube T4 with the exception that the positive bias applied to the cathode of tube T5 is in excess of the value of bias applied to the cathode of tube T4. Under these conditions there will be a volume level range for which diode tube T4 will conduct and diode tube T5 will not. For signals in excess of this value diode tube T5 will conduct and plate current will flow through diode tube T5 and cause a voltage drop across resistor R2. This voltage drop will be in the opposite direction to that flowing through resistor R1 and on a further increase in signal levels the sum of the two diode voltages will result in a value of voltages which remains substantially unchanged throughout a wide level range.

A limiting type amplifier, represented by the block 7, may be interposed between the output of transformer 2 and transformers 4 and 5. The use of such limiter makes it possible to fix the operating slope and assures the continuance of operation at this slope without regard to signal level variations above some established minimum. In the absence of such a limiter circuit there is a distinct possibility that at relatively high signal levels either or both of the differentially connected diodes may become saturated as a result of the high signal current and the differential action will be lost. The location of the potentiometers $P_5$ and $P_4$ after the limiter makes it possible to adjust the slope to any desired value. Such limiter will establish a fixed voltage level to be applied to transformers 4 and 5 throughout a volume level range in excess of its limiting value. The action of diode tubes T4 and T5 is reflected in Figure 2 between the points B and C where the amplification of tube T1 remains substantially constant throughout a wide volume level range.

For volume levels in excess of the value established as point C in Fig. 2, diode tube T6, which is biased in a similar fashion to diode T4 but having a substantially higher positive cathode bias, will conduct. The voltage drop through resistor R3 will be in such a direction as to cause a further reduction in the amplification of tube T1.

Referring to Fig. 2 which is purely illustrative, the input range is represented by the distance E. The output volume range is represented by the distance D. The dotted line represents the amplification range on the diode of the amplifier tube T1, without volume control. The volume control is represented by the solid lines A to B and C to F.

The three signal controlled diode tubes T4, T5 and T6 are provided with adjustable input controls P4, P5 and P6. The diode biasing voltages B4, B5 and B6 may also be variable. By such means various combinations of the output level range control may be established. It is desirable to provide various values of time constants for each of the several functions indicated. The action of the diode tube T6 should be comparatively rapid, while the gain reduction and increase functions of diode tubes T4 and T5 may be somewhat more slowly accomplished. The condensers shown in dotted lines across resistors R1, R2, R3, R4 and R5 are illustrative of one method of obtaining such time control.

While only one stage of amplification, tube T1, is shown, it will be understood that gain reduction may be accomplished through several stages without departing from the spirit of the invention. Similarly, push-pull or other types of amplifier circuits may be used in place of the particular amplifier circuit illustrated.

Where the several batteries have been indicated, it is, of course, understood that the required voltage may be obtained from a common power supply source or any convenient type.

Having described my invention, what I claim is:

1. An electrical circuit comprising, in combination, an electronic tube having an anode, a cathode and a grid, an imput circuit connected between said grid and said cathode, an output circuit energized by said tube, a resistor connected between said cathode and ground for biasing said cathode, means including an impedance connected between the said grid and said ground for independently biasing said grid, a variable impedance tube shunting the circuit supplying biasing potential to said grid, means for applying a portion of the power in said output circuit to a plurality of push-pull rectifier circuits, said rectifier circuits shunting respective portions of said impedance, means for maintaining said rectifier circuits inoperative when the power applied to each of said rectifier circuits is below successively increasing predetermined reference levels, and means for limiting the power applied to at least two of said rectifier circuits.

2. An electrical circuit comprising, in combination, an electronic tube having an anode, a cathode and a grid, an input circuit connected between said grid and said cathode, an output circuit energized by said tube, a resistor connected between said cathode and ground for biasing said cathode, a source of potential having positive and negative terminals, said negative terminal being connected to ground, said positive terminal being connected through an impedance to said grid for independently biasing said grid, means for shunting the circuit supplying biasing potential to said grid, means for utilizing a portion of the power in said output circuit for controlling the effectiveness of said shunting means, means for applying a portion of the power in said output circuit to a plurality of push-pull rectifier circuits, said rectifier circuits shunting respective portions of said impedance, means for maintaining said rectifier circuits inoperative when the power applied to each of said rectifier circuits is below successively increasing predetermined reference levels, and means for limiting the power applied to some of said rectifier circuits.

3. An electrical circuit comprising, in combination, a thermionic discharge tube having an anode, a cathode and a control grid, an input circuit connected between said grid and said cathode, an output circuit connected between said anode and said cathode, a source of positive biasing potential having positive and negative terminals, said negative terminal being connected to ground, a circuit connecting the said positive terminal of said biasing potential to said cathode, a circuit including a bias resistor connecting the said positive terminal of said biasing potential to said grid, means connected between said input circuit and ground for shunting the portion of said biasing potential applied to said grid, means for applying a portion of the power in said output circuit to at least three push-pull rectifier circuits, said rectifier circuits shunting respective portions of said resistor, means for utilizing said rectified power to control the effectiveness of said shunting means, means for maintaining said rectifier circuits inoperative when the power applied to each of said rectifier circuits is below successively increasing predetermined reference levels, and means for limiting the power applied to at least two said rectifier circuits.

4. An electrical circuit comprising, in combination, a first thermionic discharge tube having an anode, a cathode and a control grid, an input circuit connected between said grid and said cathode, an output circuit connected between said anode and said cathode, having positive and negative terminals, said negative terminal being connected to ground, a source of positive biasing potential, a circuit connecting the said positive terminal of said biasing potential to said cathode, a circuit including a bias resistor connecting the said positive terminal of said biasing potential to said grid, a second thermionic discharge tube having an anode, a cathode and a control grid, the cathode of said second tube being grounded and the anode of said second tube being connected between said bias resistor and the control grid of said first tube, means for utilizing a portion of the power in said output circuit to control the current flow through said second tube, means for applying a portion of the power in said output circuit to three push-pull rectifier circuits, said rectifier circuit shunting respective portions of said resistor, means for maintaining said rectifier circuit inoperative when the power applied to each of said rectifier circuits is below successively increasing predetermined reference levels, and means for limiting the power applied to two of said rectifier circuits.

5. An electrical circuit comprising, in combination, a first thermionic discharge tube having an anode, a cathode and a control grid, an output circuit connected between said anode and said cathode, a source of positive biasing potential having positive and negative terminals, said negative terminal being connected to ground, a circuit connecting the said positive terminal of said biasing potential to said cathode, a circuit including a bias resistor connecting the said positive terminal of said biasing potential to said grid, a second thermionic discharge tube having an anode, a cathode and a control grid, the cathode of said second tube being grounded and the anode of said second tube being connected between said bias resistor and the control grid of said first tube, means for applying a portion of the power in said output circuit to a plurality of push-pull rectifier circuits, said rectifier circuits shunting a portion of said resistor, means for utilizing said rectified power to control the current flow through said second tube, means for maintaining said rectifier circuits inoperative when the power applied to each of said rectifier circuits is below successively increasing predetermined reference levels, and means for limiting the power applied to some of said rectifier circuits.

6. A volume control circuit comprising, in combination, a first thermionic discharge tube having an anode, a cathode, and a control grid, an input circuit connected between said grid and said cathode, an output circuit connected between said anode and said cathode, a source of biasing potential having positive and negative terminals, said negative terminal being grounded, a first circuit connecting said positive terminal to said cathode, a second circuit including a bias resistor connecting said positive terminal to said grid, a second thermionic discharge tube having an anode, a cathode and a control grid, the cathode of said second tube being grounded and the anode of said second tube being connected between said bias resistor and the control grid of said first tube, means for rectifying a portion of the power in said output circuit, and means for utilizing said rectified power to control the current flow through said second tube, means for applying a portion of the power in said output circuit to a plurality of push-pull rectifier circuits said rectifier circuits shunting portions of said resistor, means for maintaining said rectifier circuits inoperative when the powers applied to each of said rectifier circuits are below successively increasing predetermined reference levels, and means for limiting the power applied to some of said rectifier circuits.

GEORGE K. GRAHAM

REFERENCES CITED

The following references are of record in the file of this patent:

UNITED STATES PATENTS

| Number | Name | Date |
|---|---|---|
| 2,144,224 | Koch | Jan. 17, 1939 |
| 2,144,605 | Beers | Jan. 24, 1939 |
| 2,295,410 | Kreuzer | Sept. 8, 1942 |